US008330651B2

(12) United States Patent
Vacanti

(10) Patent No.: US 8,330,651 B2
(45) Date of Patent: Dec. 11, 2012

(54) SINGLE-ANTENNA FM/CW MARINE RADAR

(75) Inventor: David C. Vacanti, Renton, WA (US)

(73) Assignee: Honeywell International Inc., Morristown, NJ (US)

( * ) Notice: Subject to any disclaimer, the term of this patent is extended or adjusted under 35 U.S.C. 154(b) by 272 days.

(21) Appl. No.: 12/751,781

(22) Filed: Mar. 31, 2010

(65) Prior Publication Data
US 2011/0122017 A1 May 26, 2011

Related U.S. Application Data

(60) Provisional application No. 61/263,744, filed on Nov. 23, 2009.

(51) Int. Cl.
*G01S 7/28* (2006.01)
(52) U.S. Cl. ............................ 342/175; 342/41; 342/195
(58) Field of Classification Search .................. 342/175, 342/41, 195
See application file for complete search history.

(56) References Cited

U.S. PATENT DOCUMENTS

| | | | | | |
|---|---|---|---|---|---|
| 3,680,085 | A | * | 7/1972 | Del Signore | 342/128 |
| 3,778,827 | A | * | 12/1973 | Strenglein | 342/80 |
| 3,806,922 | A | * | 4/1974 | Isbister | 342/44 |
| 4,118,703 | A | * | 10/1978 | Williams | 342/158 |
| 4,829,312 | A | * | 5/1989 | Terakawa et al. | 343/756 |
| 5,612,702 | A | | 3/1997 | Kinsey | |
| 5,701,127 | A | * | 12/1997 | Sharpe | 340/10.2 |
| 5,757,330 | A | * | 5/1998 | Parfitt | 343/772 |
| 6,492,949 | B1 | * | 12/2002 | Breglia et al. | 343/700 MS |
| 7,071,868 | B2 | * | 7/2006 | Woodington et al. | 342/70 |
| 7,239,266 | B2 | | 7/2007 | Vacanti | |
| 7,592,943 | B2 | | 9/2009 | Beasley | |
| 7,864,103 | B2 | * | 1/2011 | Weber et al. | 342/123 |
| 2003/0095074 | A1 | * | 5/2003 | Scorer et al. | 343/772 |
| 2005/0190101 | A1 | * | 9/2005 | Hiramatsu et al. | 342/175 |
| 2005/0200515 | A1 | * | 9/2005 | Cherniakov | 342/51 |
| 2008/0266171 | A1 | * | 10/2008 | Weber et al. | 342/123 |
| 2009/0174499 | A1 | * | 7/2009 | Hiramatsu et al. | 333/139 |
| 2010/0117923 | A1 | * | 5/2010 | Storz | 343/878 |
| 2010/0188281 | A1 | * | 7/2010 | Hayata et al. | 342/118 |
| 2010/0265121 | A1 | * | 10/2010 | Bandhauer et al. | 342/135 |
| 2011/0122017 | A1 | * | 5/2011 | Vacanti | 342/175 |

FOREIGN PATENT DOCUMENTS

EP 0138253 4/1985

(Continued)

OTHER PUBLICATIONS

Simrad BR24 Broadband Radar Wins NMMA/BWI Innovation award at 68th Miami International Boat Show Date: Feb. 18, 2009 http://www.navico.com/en/Media/Press-releases/Simrad-BR24-Broadband-Radar-wins-Innovation-award/.

(Continued)

*Primary Examiner* — John B Sotomayor
(74) *Attorney, Agent, or Firm* — Lowe Graham Jones, PLLC

(57) ABSTRACT

A high resolution, low power marine radar for use in applications such as the newly mandated barge/river radars that are to be used in very confined spaces such as canals. An example radar system includes frequency-modulated/continuous-wave (FM/CW) radar that uses very low transmitter power (a fraction of a watt) and has an exceptionally short sensing range of a few feet or even inches if needed.

17 Claims, 5 Drawing Sheets

FOREIGN PATENT DOCUMENTS

| | | | | |
|---|---|---|---|---|
| JP | 60261204 | A | * | 12/1985 |
| JP | 61012103 | A | * | 1/1986 |
| JP | 63227204 | A | * | 9/1988 |
| JP | 05209953 | A | * | 8/1993 |
| JP | 2009005086 | A | * | 1/2009 |
| RU | 2127012 | C1 | * | 2/1999 |

OTHER PUBLICATIONS

John Ondria and A.G. Cardiasmenos, Military Microwaves '80, The Cunard International Hotel, London, England, EUREL The convention of National Societies of Electrical Engineers of Western Europe, The Institution of Electrical Engineers, The Institution of Electronic and Radio Engineers, Microwave Theory and Techniques Society of the IEEE, Oct. 24, 1980.

* cited by examiner

SINGLE-ANTENNA FM/CW MARINE RADAR

PRIORITY CLAIM

This application claims priority to U.S. Provisional Application Ser. No. 61/263,744 filed on Nov. 23, 2009, the contents of which are hereby incorporated by reference.

BACKGROUND OF THE INVENTION

Present day marine radars are very high-powered systems that transmit many kilowatts of peak power and have great difficulty in dealing with exceptionally short ranges of a few feet within the confines of river channels and locks, in addition to providing fine range resolution at ranges of many nautical miles.

Navico provides a frequency modulated/continuous wave (FM/CW) radar for commercial marine radar applications. The actual waveform used by Navico is a single sawtooth having a 10% or higher duty cycle. Their system also uses separate transmit and receive antennas to provide isolation. The Navico system is expensive because it uses two antennas with transmitter electronics on the back of the transmit antenna and receiver electronics on the back of the receive antenna. Navico fails to generate an ultra-linear Frequency Modulation with exceptionally low phase noise. Navico fails to recognize that a sawtooth waveform will cause several problems for the signal processing system. Navico also fails to recognize that the antenna VSWR must be better than 1.2:1 across the operating frequency band and that there is a critical need to provide a means to cancel the phase noise of the transmitter in the receiver mixer by carefully designed circuit timing delay.

SUMMARY OF THE INVENTION

The present invention provides a high resolution, low power marine radar for use in applications that may include the newly mandated barge/river radars that are to be used in very confined spaces such as the canals of the US, France, Germany, or The Netherlands.

An example radar system includes frequency-modulated/continuous-wave (FM/CW) radar that uses very low transmitter power (a fraction of a watt) and has an exceptionally short sensing range of a few feet or even inches if needed, in addition to operating ranges of tens of nautical miles. The system provides the following features:
  Very Low Phase Noise Transmitter;
  Excellent Linear Frequency Modulation;
  Direct Integration of a Single Antenna with the Transmitter and Receiver:
    Matched delay between antenna reflection and local oscillator arrival;
  Very Low Voltage Standing Wave Ratio (VSWR) Antenna;
  Excellent Execution of RF Circuitry:
    Very Low VSWR among circuits,
  Very Low Transmitter to Receiver Coupling.
The frequency diversity of the FM/CW radar is also exceptionally valuable to improving probability of detection at sea.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
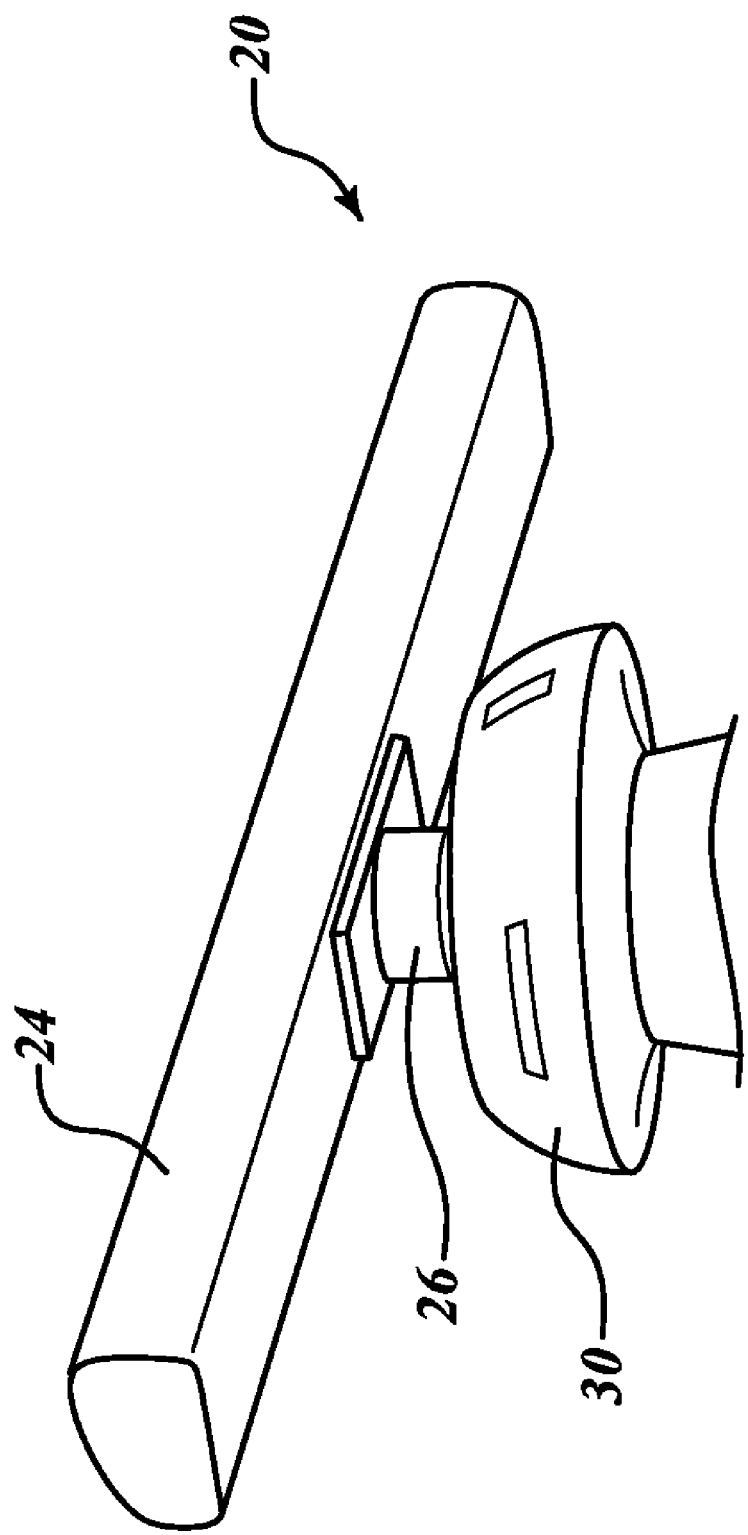
FIG. 1 illustrates a perspective view of a radar system formed in accordance with an embodiment of the present invention.

FIG. 1 is a perspective view of an exemplary single antenna radar device 20. The radar device 20 includes a motor case mounting base 30, an antenna radome 24, and a waveguide rotary joint 26. The waveguide rotary joint 26 allows the antenna radome 24 to rotate about the base 30.

In one embodiment, the rotary joint 26 provides data and power connections between the base 30 and a single antenna (not shown) within the antenna radome 24. In one embodiment, data transfer includes one or more of capacitive, fiber optic, or inductive transfer. The size and gearing on the rotary joint 26 are selected to provide adequate wind- and shock-loading protection. In the preferred embodiment, the rotary joint 26 is a waveguide rotary joint that conducts the transmitted signal to the antenna (located within the radome 24), receives signals from the antenna and supplies the received signal to the receiver as shown in FIG. 2.

The single antenna is used for both transmit and receive modes. Exemplary methods that permit the use of a single antenna are described in U.S. Pat. No. 7,239,266, which is hereby incorporated by reference. The present invention outputs a true continuous triangle FM/CW waveform.

In one embodiment, power transfer to the antenna radome 24 is accomplished using induction coupling (i.e., transformer coupling across the rotary joint 26).

Figure 2:
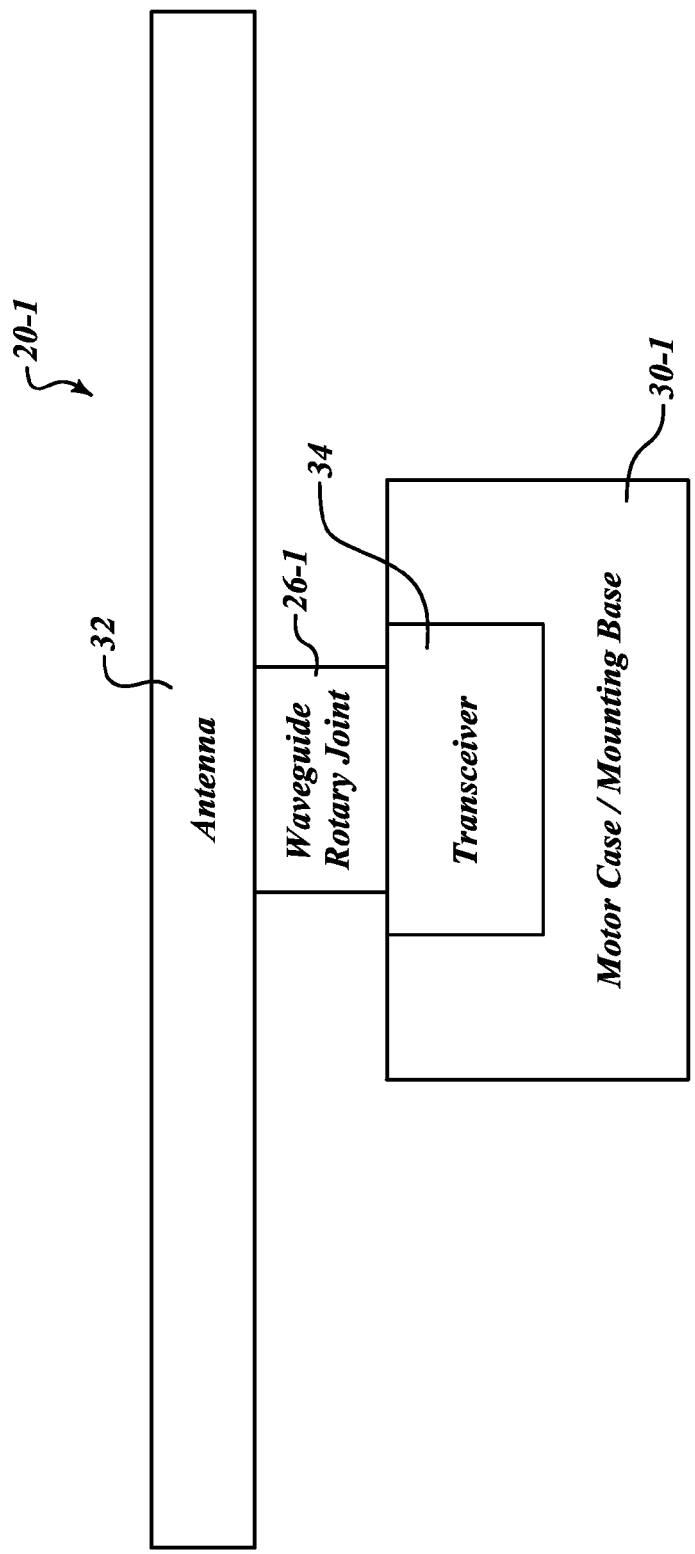
FIG. 2 is a block diagram of one embodiment of the present invention.

In one embodiment, as shown in FIG. 2, a system 20-1 includes a waveguide rotary joint 26-1, a single slotted waveguide antenna 32, and a transmitter and receiver (transceiver) 34 that is located inside a motor case/mounting base 30-1. The transceiver 34 includes an FM/CW radar (not shown). In one embodiment, the slotted waveguide antenna 32 is connected by a waveguide extension (not shown) to the output of the waveguide rotary joint 26-1. The rotary joint 26-1 is designed for stable VSWR below 1.2:1 over all angles of rotation.

The slots in the single slotted waveguide antenna 32 run vertically on the narrow dimension of the antenna 32. The slots may be arranged on the narrow side of the waveguide antenna to provide Horizontal Polarization—all in the same direction as shown in FIG. 3.

Figure 4:
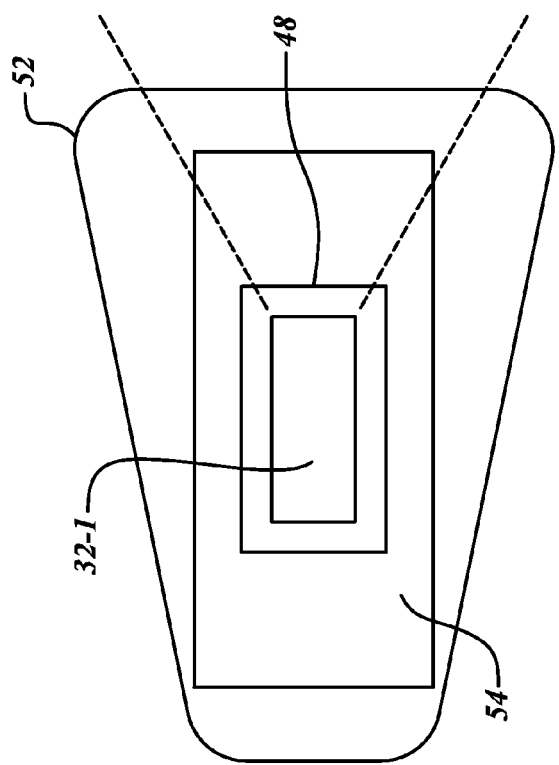
FIG. 4 is an exploded end view of the antenna radome components of FIG. 3.
Figure 3:
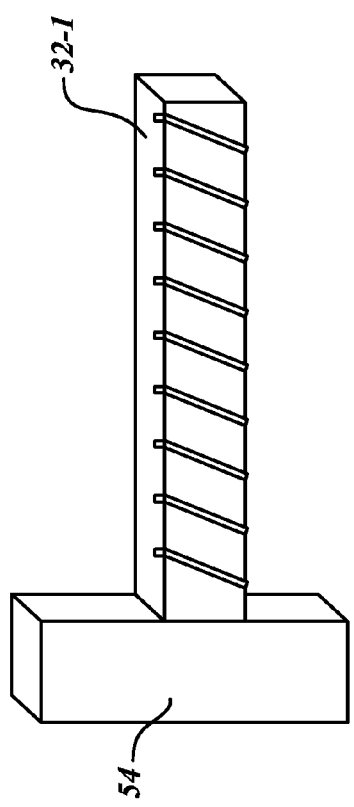
FIG. 3 is a front view of antenna radome components formed in accordance with one embodiment of the present invention that places the transceiver at the input end of the antenna.
Figure 5:
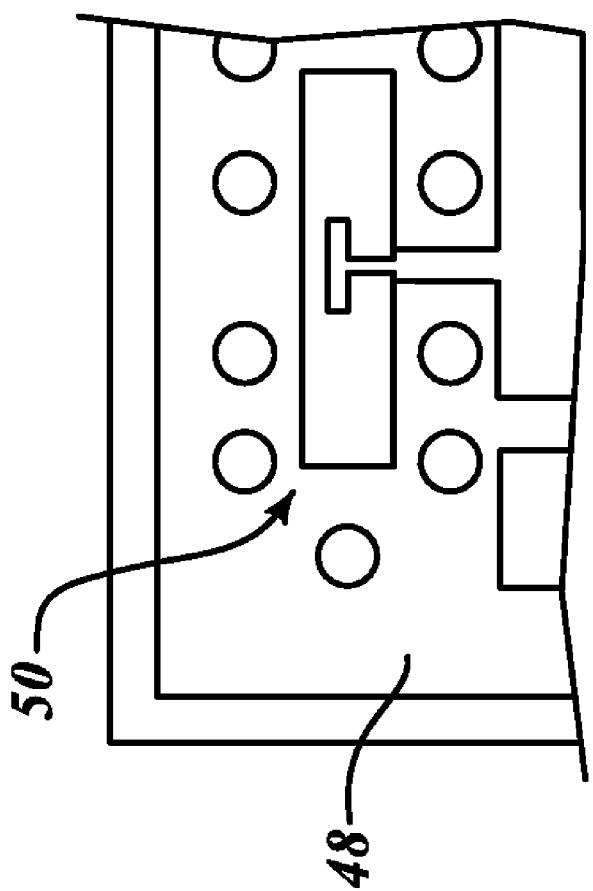
FIG. 5 is a partial view of a circuit board included as one of the transceiver components.

As shown in FIGS. 3-5, a transceiver, board power supply and digital signal processing (DSP) (not shown) are mounted on a circuit board 48 within a box 54 that holds the circuit board 48. A slotted waveguide antenna 32-1 is directly mated to the transceiver via a microstrip to waveguide transition 50 located on the circuit board 48. The slotted waveguide antenna 32-1 and the box 54 are located within an antenna radome 52. The microstrip to waveguide transition 50 provides waveguide transition and is built directly into the chassis/box 54 of the transceiver 48 and is a microstrip circuit. FIG. 4 is an x-ray view through the end of the antenna radome 52 and the box 54.

In one embodiment, power and serial data traverse the rotary joint. A transceiver antenna port and an input port of the antenna are placed in direct contact with each other via the microstrip to waveguide transition 50. The antenna has a VSWR of 1.2:1 or better to minimize the amount of power that is reflected from the antenna to the receiver input. This reflected power level can destroy receiver sensitivity.

The transceiver is configured such that phase noise cancellation will occur in the receiver mixer due to exceptionally short distances from the antenna.

The transceiver has less than −120 dBm receiver sensitivity and <10 KHz receiver bandwidth. Transmitter power is approximately 0.1 watt continuous. Digitally synthesized linear frequency modulation is provided. Another characteristic of the transceiver is a transmitter phase noise level that is <−100 dBc/Hz @ 100 KHz offset.

The present invention provides Doppler and phase measurements and advanced sea/rain clutter reduction algorithms. The present invention also provides preprogrammed electronic gain vs. range and manual gain control. The present invention provides instantaneous electronic gain versus range through the use of a High Pass Filter placed in an Intermediate Frequency (IF) Subsystem of the radar. The High Pass Filter upper frequency limit is the maximum IF frequency expected over range to targets for a given modulation rate. Highest IF Frequency in Hz=((Linear FM Bandwidth in Hz)/(Modulation Period in Seconds))×((2*Range in Meters)/(c speed of light in meters/sec)). In the present invention that frequency is typically 2 MHz. The present invention (FM/CW radar system) produces an output in the frequency domain where the range to a target is directly proportional to the IF frequency of the target. Therefore it is possible to provide instantaneous gain compensation for each target due to range variation through the use a high pass filter with a gain versus IF Frequency slope that matches the expected variation of the particular radar. For example FM/CW radars used for Weather radar systems require a slope of 9 dB per octave, Altimeters require 6 dB per octave, while airborne and marine radar systems require a slope of 12 dB per octave in frequency. Dynamic range due to the reflectivity of targets observed by the radar is accommodated via an Analog to Digital converter with 10-16 bit resolution.

Figure 6:
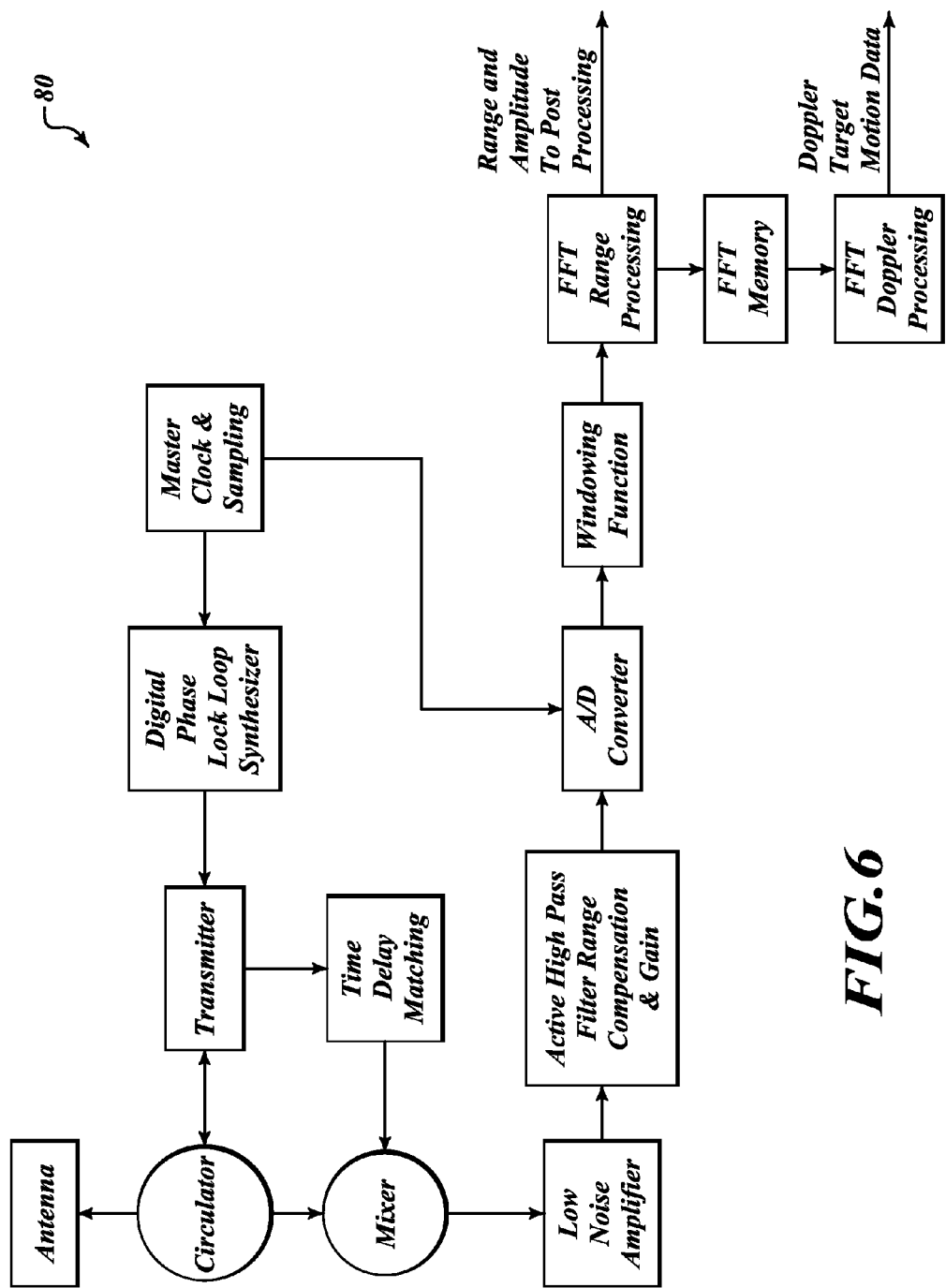
FIG. 6 is a block diagram of transceiver components in accordance with an embodiment of the present invention.

FIG. 6 illustrates the transmitter, receiver and DSP components 80 common to the embodiments described above. The arrival of an antenna reflection is matched to the arrival time of the local oscillator signal so as to provide phase noise cancellation in the receiver mixer. It is critical to note that no low noise amplifier may be placed between the circulator and the receiver mixer as this will seriously degrade system performance. The low noise amplifier will amplify phase noise, transmitter to receiver leakage and power reflected from the antenna before it reaches the mixer. Therefore a typical microwave low noise amplifier may not be used in single antenna FM/CW radars. A low noise microwave amplifier is also not recommended for dual antenna FM/CW radars because the amplifier will reduce the transmitter to receiver isolation by an amount equal to the gain of the amplifier.

The present invention can include an antenna scaled to any size.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A radar system comprising:
    a single slotted waveguide antenna;
    a circulator in signal communication with the antenna, wherein the circulator comprises only three ports;
    a transceiver in signal communication with the antenna, the transceiver comprising:
        a receiver mixer connected directly to an output of the circulator;
        a component configured to provide a local oscillator signal using a sample of a transmitter signal; and
        a component configured to match arrival time of the local oscillator signal with a signal associated with at least one of leakage or reflected power signals, thereby performing phase noise cancellation in the receiver mixer.

2. The system of claim 1, wherein phase noise of the transceiver is less than −100 dBc/Hz at an offset of 100 KHz.

3. The system of claim 2, wherein the transceiver performs triangle wave modulation and continuous transmission and reception.

4. The system of claim 3, wherein a voltage standing wave ratio (VSWR) of the antenna is less than 1.2:1 across an operating frequency band.

5. The system of claim 4, wherein the transceiver comprises an Intermediate Frequency (IF) subsystem, the IF subsystem comprises an Active High Pass filter with gain configured to instantly compensate for range variations to a target.

6. The system of claim 4, wherein the IF subsystem further comprises an Active Low Pass filter configured to attenuate all signals outputted by the Active High Pass filter greater than the highest expected IF frequency.

7. The system of claim 6, wherein the highest expected IF frequency is the product of Linear Frequency Modulation rate in Hz/sec times the ratio of twice the most distant desired range to the speed of light.

8. The system of claim 4, further comprising:
    a base configured to house the transceiver, a power supply and a Digital Signal Processor (DSP);
    an antenna radome configured to house the antenna; and
    a waveguide rotary joint coupled between the transceiver and the antenna, the waveguide rotary joint configured to transmit microwave energy 9. The system of claim 8, wherein the base comprises a circuit board, wherein the transceiver is located on the circuit board, the circuit board comprising a microstrip to waveguide transition component configured to transmit signals between the transceiver and the Waveguide Rotary Joint.

10. The system of claim 8, wherein a VSWR of the waveguide rotary joint is at or below 1.2:1.

11. The system of claim 4, further comprising:
    a base configured to house a DSP;
    a radome configured to house the antenna, the circulator and the transceiver; and
    a power and data rotary joint coupled between the base and the radome, the power and data rotary joint configured to provide data and power connections between the DSP and the transceiver.

12. The system of claim 11, wherein the antenna radome comprises a circuit board, wherein the transceiver and circulator are located on the circuit board, the circuit board comprising a microstrip to waveguide transition component configured to transmit signals between the transceiver and the antenna.

13. The system of claim 12, wherein one end of the antenna is directly attached to the circuit board at the microstrip to waveguide transition component.

14. The system of claim 11, wherein the power and data rotary joint provides induction coupling.

15. The system of claim 11, wherein the power and data rotary joint provides capacitive coupling.

16. The system of claim 11, wherein the power and data rotary joint provides optical coupling.

17. A radar system comprising:
a single slotted waveguide antenna;
a circulator in signal communication with the antenna;
a transceiver in signal communication with the antenna, the transceiver comprising:
a receiver mixer connected directly to an output of the circulator interface to the transmitter and antenna;
a component configured to provide a local oscillator signal using a sample of a transmitter signal; and
a component configured to match arrival time of the local oscillator signal with a signal associated with at least one of leakage or reflected power signals, thereby performing phase noise cancellation in the receiver mixer,
wherein phase noise of the transceiver is less than −100 dBc/Hz at an offset of 100 KHz,
wherein the transceiver performs triangle wave modulation and continuous transmission and reception,
wherein a voltage standing wave ratio (VSWR) of the antenna is less than 1.2:1 across an operating frequency band.

* * * * *